Figure 1:
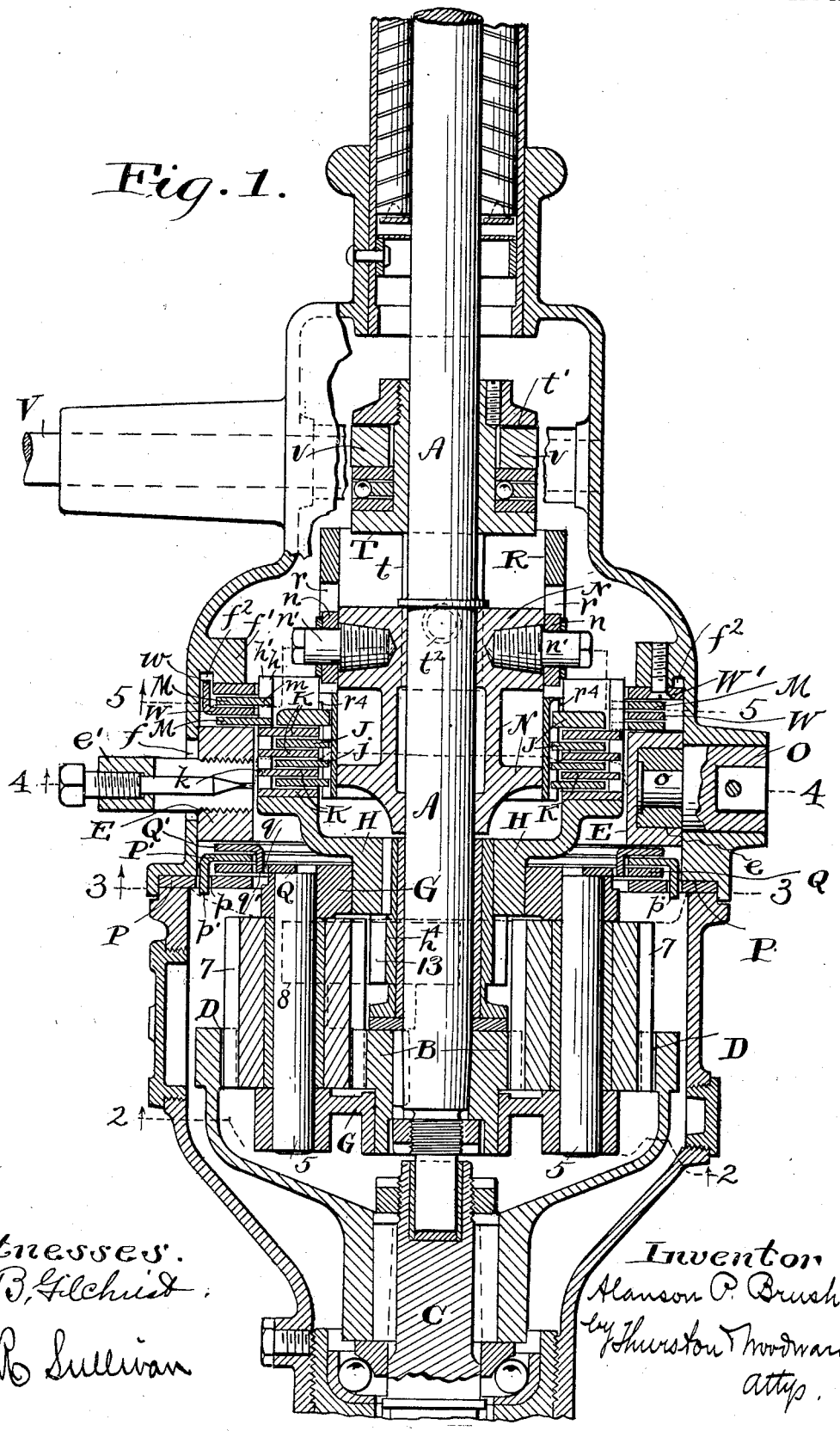

A. P. BRUSH.
PLANETARY TRANSMISSION MECHANISM.
APPLICATION FILED APR. 10, 1908.

944,597.

Patented Dec. 28, 1909.
4 SHEETS—SHEET 1.

Witnesses.
E. B. Fairchild
H. B. Sullivan

Inventor
Alanson P. Brush
by Thurston & Woodward
attys.

A. P. BRUSH.
PLANETARY TRANSMISSION MECHANISM.
APPLICATION FILED APR. 10, 1908.

944,597.

Patented Dec. 28, 1909.
4 SHEETS—SHEET 3.

Witnesses
E. B. Gilchrist
H. B. Sullivan

Inventor.
Alanson P. Brush
by Thurston Woodward
attys.

A. P. BRUSH.
PLANETARY TRANSMISSION MECHANISM.
APPLICATION FILED APR. 10, 1908.
944,597. Patented Dec. 28, 1909.
4 SHEETS—SHEET 4.
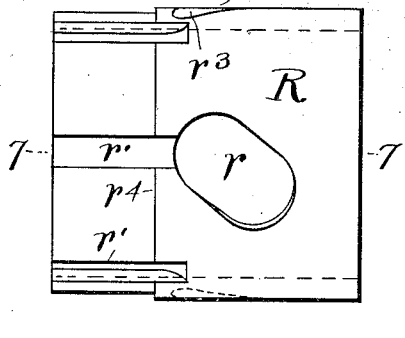
Fig. 6.
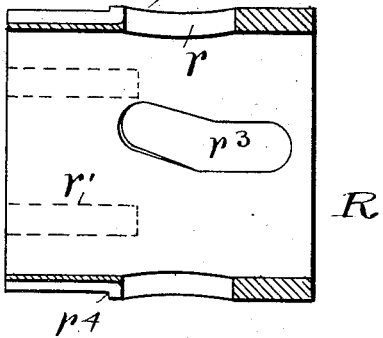
Fig. 7.
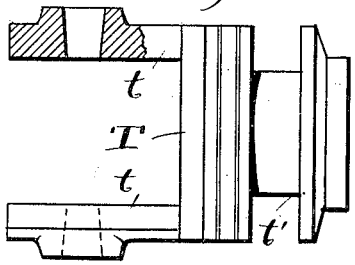
Fig. 8.
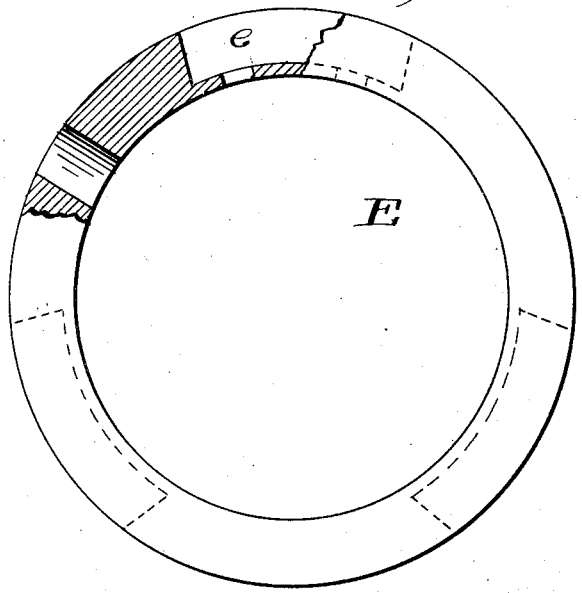
Fig. 10.
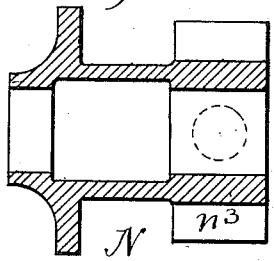
Fig. 9.
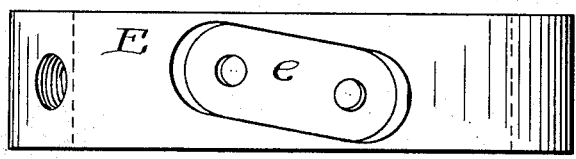
Fig. 11.
Fig. 12.
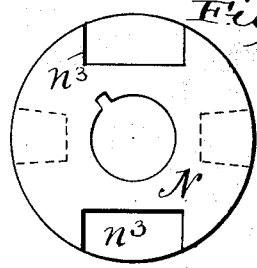
Fig. 13.
Witnesses.
E. B. Gilchrist
H. P. Sullivan
Inventor
Alanson P. Brush
By Thurston Woodward
atty.

UNITED STATES PATENT OFFICE.

ALANSON P. BRUSH, OF DETROIT, MICHIGAN.

PLANETARY TRANSMISSION MECHANISM.

944,597.  Specification of Letters Patent.  Patented Dec. 28, 1909.

Application filed April 10, 1908. Serial No. 426,236.

*To all whom it may concern:*

Be it known that I, ALANSON P. BRUSH, a citizen of the United States, residing at Detroit, in the county of Wayne and State of Michigan, have invented a certain new and useful Improvement in Planetary Transmission Mechanism, of which the following is a full, clear, and exact description.

This invention is an improvement upon the planetary transmission gear which forms the subject matter of my prior patent No. 752,953.

The primary object of the present invention is to adapt the invention of said prior part to use multiple disk clutches instead of the single surface friction clutches and brakes shown in said prior patent.

The invention may be here summarized as consisting of the combinations of parts shown in the drawing and hereinafter described and definitely pointed out in the claims.

Figure 2:
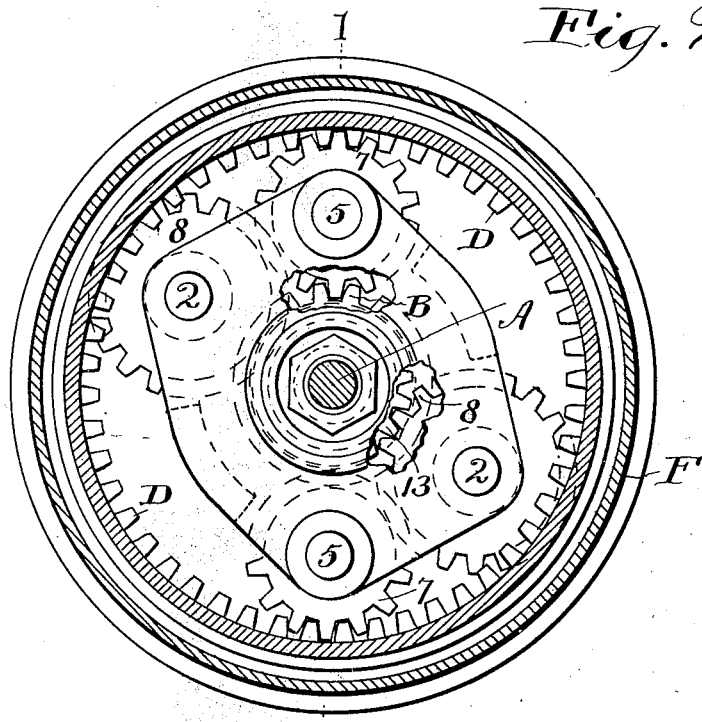
Figure 3:
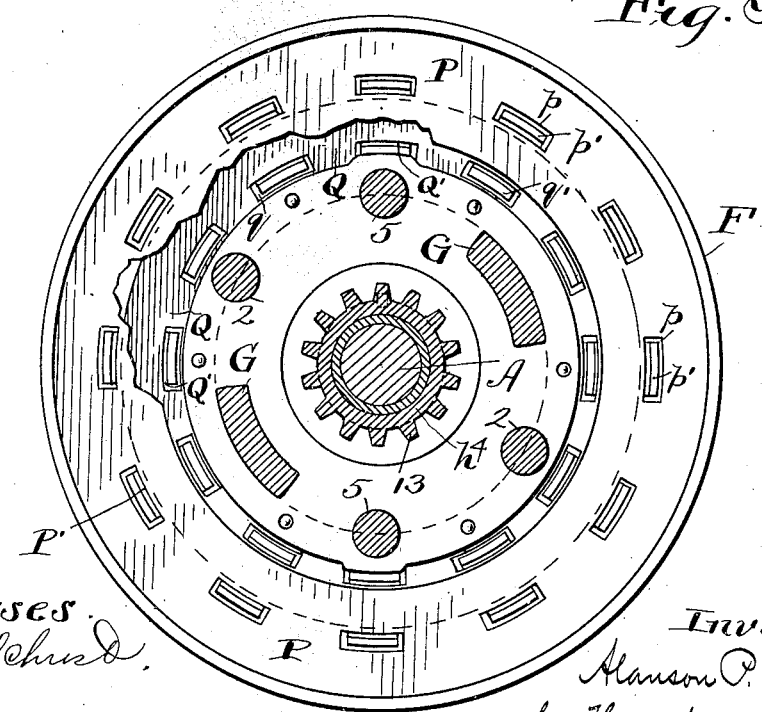
Figure 4:
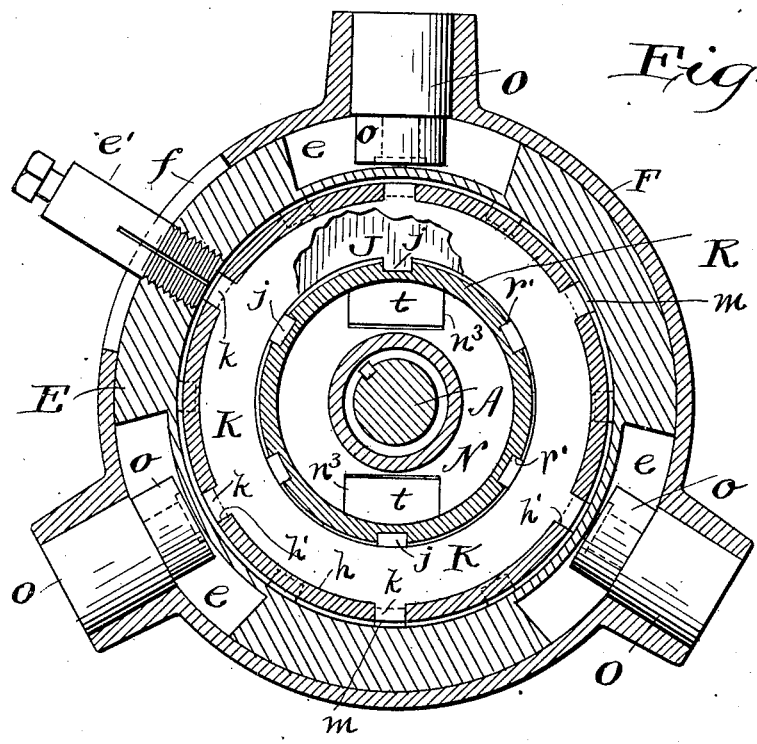
Figure 5:
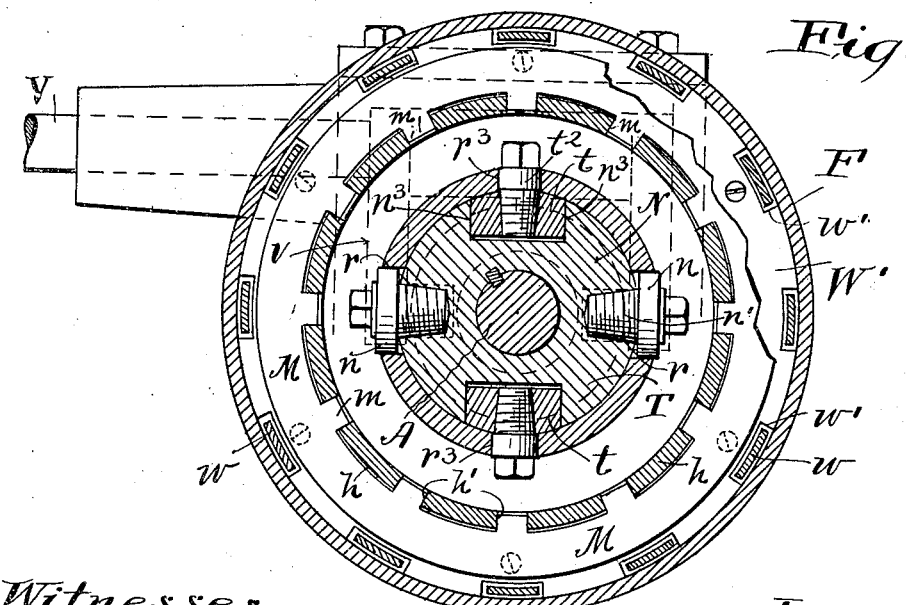

In the drawing, Figure 1 is a central longitudinal section of mechanism embodying the present invention, said section being in the plane indicated by line 1—1 in Fig. 2. Fig. 2 is a transverse sectional view in the plane indicated by line 2—2 on Fig. 1. Fig. 3 is a transverse sectional view on line 3—3 of Fig. 1. Fig. 4 is a transverse sectional view on line 4—4 of Fig. 1. Fig. 5 is a transverse sectional view on line 5—5 of Fig. 1. Fig. 6 is a detached view of the pressure sleeve R. Fig. 7 is a longitudinal sectional view of said sleeve in the plane indicated by line 7—7 of Fig. 6. Fig. 8 is a detached elevation partly in section of the sliding sleeve T. Fig. 9 is an elevation of the same sleeve in a plane at right angles to that in which it is shown in Fig. 8. Fig. 10 is an end view partly broken away of the ring N. Fig. 11 is a top view of the ring shown in Fig. 10. Fig. 12 is a longitudinal central section of the sleeve K; and Fig. 13 is an end view of the sleeve K.

Referring to the parts by characters, A represents the driving member, which is a shaft adapted to be turned at approximately uniform speed; and C is the driven member shown in the form of a shaft, which is to be driven by the driving shaft through the transmission mechanism shown, at different speeds and either forward or backward as compared with the driving shaft.

D represents an internal gear which is fixed to the driven shaft.

B represents a gear fixed to the driving shaft.

G represents the reversing member which is mounted so as to be rotatable on an axis which is concentric with the axis of the two shafts. Gears 7 are mounted on studs 5 secured to the reversing member and parallel with the axis of the shafts A and C; and they mesh with both the internal gear D and with the gear B. If, therefore, the reversing member is held against rotation, the shaft C will be turned in the opposite direction to the shaft A and at a speed relative thereto, which is determined by the relative diameters of the gears B and C.

H represents the low speed member which is rotatively mounted upon the shaft A. Specifically, it is keyed to a sleeve $h^4$ which is rotatably mounted on shaft A, and a gear 13 is also rigid with said sleeve. Gears 8 are rotatively mounted on studs 2 fixed to the reversing member G and parallel with the axis of shaft A; and these gears 8 mesh with the gear 13, and each meshes with one of the gears 7. If, now, the low speed member H be held against rotation, the shaft C will be driven in the same direction as the shaft A through the interaction of gears 13, 8, 7, B and D, but at slower speed than shaft A.

N is a sleeve which is keyed to shaft A. When it and the slow speed member H are connected so as to rotate in unison, the rotary motion will be transmitted to shaft C which will be caused to rotate at the same speed as shaft A because the described mechanism, to wit,—gears 13, 8, 7, B and D will all move as a unit with shaft A.

All parts above mentioned, except sleeve N, are the equivalents, broadly considered, of corresponding parts disclosed in said prior patent. The parts differ in form and in relative arrangement, and some of these differences are parts of the invention herein disclosed, and now to be described, in and by which multiple disk clutches and brakes are rendered available in mechanism of this sort.

All of the described mechanism is inclosed within a non-rotatable case F, within which a ring E is rotatably mounted. In the periphery of this ring are several spirally disposed slots e. Into each of these slots e projects a stud O carrying a friction roller o on its inner end, said studs being fixed to the casing. If now this ring be turned in either direction within the casing, (as it may be by power applied to an arm e' fixed to the ring and extending out through a slot f in the casing) it will, by reason of the spiral inclination of said slots, be also moved longitudinally. At one side of this ring E are two series of friction disks,—the disks of one series alternating with the disks of the other series. The purpose of these disks is to frictionally connect the reversing member G with the casing F. One series of disks comprises the disk P which is rigidly fixed to the casing, and a disk P' having a series of fingers p' which enter and are movable longitudinally in holes p in the disk P. The other series of disks comprise the disk Q which is fixed to the end of the member G, and the disk Q' which has fingers q' which enter and are movable longitudinally in holes q in the disk Q. Portions of the disk P', Q and Q' lie between the fixed disk P and the side of the ring E. When said ring is turned in the same direction as shaft A is turned, said ring will be moved so as to press into frictional contact the two series of disks which thereby act as a brake to hold member G immovable within the casing. The member G is movable endwise a short distance so as to permit this action. Another collection of friction disks is provided for frictionally connecting the low speed member H to the casing. This member has a cylindrical flange h in which a series of longitudinal grooves h' are cut. The disks are mounted upon the grooved cylindrical flange h. The disks M of one series have tongues m which enter the grooves h'. The disk W of the other series has a series of fingers w which enter and are movable longitudinally in notches w' in the disk W', which fingers also enter holes f² in an annular inwardly directed flange f' of the casing. All of the collection of disks referred to are movable longitudinally, but the disks M rotate with the member H, while the disks W, W' cannot rotate. When the ring E is turned in the opposite direction to that in which the shaft A rotates, it also moves endwise so as to press these disks into frictional contact and so lock member H to the casing. The action of the described mechanism is such that the member H tends to turn in the direction opposite to that in which the shaft A is rotating. If it is not completely locked by the frictional contact of the described disks against this movement, the frictional drag of the disk M upon ring E will turn said ring in that direction which will cause it to move endwise to still closer press said disks together. There is a similar automatic locking action of the ring E in connection with the disks which connect the reversing member G with the casing; for this reversing member tends to turn with the shaft; and, if it does, the frictional drag of the disk Q' upon the ring E will turn said ring in that direction which will move it endwise so as to more firmly press said friction disks together. In other words, when the disks of either collection have been brought into such frictional contact that they tend to check the turning of member G or H, as the case may be, the described parts act automatically to so move ring E as to completely set the disk brakes.

The following mechanism has a part in frictionally clutching the shaft A with the member H. A sleeve R is movable longitudinally upon member N, which, it will be remembered, is keyed to shaft A; and said sleeve is also capable of being slightly turned upon said member N. In this sleeve are inclined slots r, in which are friction rollers n mounted on studs n' secured to and projecting radially from the member N. If the sleeve R is moved longitudinally, it must turn, and vice versa. On the sleeve R are a series of disks J having tongues j which project into longitudinal grooves r' in said sleeve. Alternating with these disks are other disks K having tongues k which enter longitudinal grooves h' in the flange h, wherefore the disks K must rotate with flange h, but may move longitudinally thereon. The disks J and K lie between the end of member H and a pressure shoulder r⁴ on sleeve R.

T represents a sliding sleeve having longitudinally extended arms t which enter and are movable in recesses n³ in the end of the sleeve N, wherefore this sliding sleeve T must rotate with the shaft. It may be moved longitudinally by any suitable means, as for example a rock-shaft V carrying a fork v which engages in an annular groove t' in the sleeve T. On the arms t are radially projecting studs t² which project into slots r³ in the sleeve R. The rear ends of these slots are parallel with the axis of the sleeve, but their front ends are inclined in approximately spiral form,—the inclination being the reverse of the inclination of the slots r. Now, when the sleeve T is moved forward, and so long as the studs t² are in the straight part of the slots r³ said sleeve R is not moved. But when said studs enter the inclined part of said slots the sleeve is turned, and because of the studs in the other slots r the sleeve R is moved to the left, thereby forcing the disks J, K, into frictional contact, whereby the sleeve R and member H are compelled to rotate with shaft A. The slots r are inclined in such direction that if, after initial contact of the friction surfaces is produced, shaft A goes faster than member H,—the studs n' will by their action in slots r move sleeve R in the clamping direction. That is to say when once the initial friction contact between the clutch disks is produced, the clutch is self-locking whatever may be the load.

Having thus described my invention, I claim:

1. In planetary gearing, the combination of a driving shaft, a concentric driven member, and intermediate mechanism including a rotatable transmission member which becomes effective only when its rotation is prevented, a fixed casing in which said mechanism is inclosed, and a multiple disk clutch for frictionally connecting said transmission member to the casing.

2. In planetary gearing, the combination of a driving shaft, a driven member, and intermediate mechanism including a rotatable transmission member which becomes effective only when its rotation is prevented, a fixed casing in which said mechanism is inclosed, a multiple disk clutch for frictionally clamping said transmission member to the casing, which clutch includes a pressure member which, when it moves longitudinally in the clamping direction, must also turn in the direction in which said transmission member seeks to turn, and vice versa, and mechanism for moving said pressure member.

3. In planetary gearing, the combination of a driving shaft, a driven member and intermediate mechanism, including a rotatable transmission member which becomes effective only when its rotation is prevented, a fixed casing in which said mechanism is inclosed, a multiple disk clutch for frictionally clamping said transmission member to the casing, a ring mounted and adapted to turn in said casing, means whereby the ring as it turns is compelled to move longitudinally, and mechanism projecting from the casing whereby said ring may be turned.

4. In planetary gearing, the combination of a driving shaft, a driven member, and intermediate mechanism including a rotatable transmission member which becomes effective only when its rotation is prevented, a fixed casing in which said mechanism is inclosed, a multiple disk clutch for frictionally clamping said transmission member to the casing, a ring rotatably mounted in the casing and having in its outer periphery a plurality of inclined slots, studs fixed to said casing and projecting into said slots, and mechanism for turning said ring.

5. In planetary gearing the combination of a driving shaft, a driven member, and intermediate mechanism including a rotatable member which becomes effective only when its rotation is prevented, an inclosing casing and a multiple disk clutch, the disks of one series including one disk connected to said reversing member and having holes through it, and a disk having longitudinally extended fingers which enter said holes, and the disks of the other series including a disk intermediate of the disks of the first named series having longitudinally extended fingers which enter holes in a part fixed to the casing, and means for moving said disks longitudinally into frictional contact.

6. In planetary gearing, the combination of a driving shaft, a driven member, and intermediate mechanism which includes a rotatable low speed member which becomes effective only when its rotation is prevented, said member having a longitudinally slotted cylindrical flange, friction disks mounted upon said flange and having tongues which enter the grooves thereof, a casing inclosing said mechanism having an inwardly turned annular flange $f'$, a series of friction disks embracing the cylindrical flange of the low speed member, one of said disks being adjacent to the flange $f'$ and one lying between disks of the first named series, which latter disk has longitudinally extended fingers which pass into holes in the flange $f'$ and through notches in the disk adjacent thereto, and a ring mounted within said casing and connected therewith by means substantially as described which compel it to turn and move longitudinally at the same time, said ring being arranged in opposition to the flange with both series of disks between said parts.

7. In planetary gearing, the combination of a driving shaft, a driven member, and intermediate mechanism which includes a rotatable low speed member and a rotatable reversing member, which members respectively become effective only when their rotation is prevented, an inclosing casing and multiple disk clutches within said casing arranged to connect the low speed member and the reversing member respectively with said casing, and a pressure member within the casing common to both multiple disk clutches.

8. In planetary gearing, the combination of a driving shaft, a driven member, and intermediate mechanism which includes a rotatable low speed member and a rotatable reversing member, which members respectively become effective only when their rotation is prevented, an inclosing casing, and two multiple disk clutches within said casing arranged to connect the low speed member and the reversing member respectively with said casing, a ring rotatably mounted in said casing between the two multiple disk clutches, and connections between said ring and casing whereby when the ring is turned it must move longitudinally, and mechanism for turning said ring.

9. In planetary gearing, the combination of a driving shaft, a driven member, and intermediate mechanism which includes a low speed member rotatably mounted upon said shaft, and a multiple disk clutch for connecting said low speed member with said driving shaft.

10. In planetary gearing, the combination of a driving shaft, a driven member, and intermediate mechanism which includes a low speed member rotatably mounted upon said shaft, a series of longitudinally movable friction disks connected with the low speed member, an intermediate series of longitudinally movable disks, a sleeve embracing the shaft, with which sleeve the latter series of disks are connected, and mechanism by which said sleeve, when it is turned relatively to said shaft, is compelled to move longitudinally and vice versa, said sleeve and low speed member carrying respectively shoulders between which the specified disks lie.

11. In planetary gearing, the combination of a driving shaft, a driven member, and intermediate mechanism which includes a low speed member rotatably mounted upon said shaft, a series of longitudinally movable friction disks connected with the low speed member, an intermediate series of longitudinally movable disks, a sleeve embracing the shaft, with which sleeve the latter series of disks are connected, and mechanism by which said sleeve, when it is turned relatively to said shaft, is compelled to move longitudinally, and vice versa, said sleeve and low speed member carrying respectively shoulders between which the specified disks lie, and means for turning said sleeve.

12. In planetary gearing, the combination of a driving shaft, a driven member, and intermediate mechanism which includes a low speed member rotatably mounted upon said shaft, a series of longitudinally movable friction disks connected with the low speed member, an intermediate series of longitudinally movable disks connected with said shaft, a pressure sleeve embracing the shaft, and having an inclined slot, and a stud fixed to and projecting radially from said shaft into said slot, and means for moving the sleeve relatively to the shaft.

13. In planetary gearing, the combination of a driving shaft, a driven member, and intermediate mechanism which includes a low speed member rotatably mounted upon said shaft, a series of longitudinally movable friction disks connected with the low speed member, an intermediate series of longitudinally movable disks, a pressure sleeve embracing the shaft, with which sleeve the latter series of disks are connected, said sleeve having two oppositely inclined slots, studs fixed to and projecting radially from the shaft into one of said slots, a sliding sleeve mounted on the shaft and compelled to rotate therewith, and a stud secured thereto projecting into the other inclined slot in the slotted sleeve.

14. In planetary gearing, the combination of a driving shaft, a driven member, and intermediate mechanism which includes a low speed member rotatably mounted upon said shaft, a series of longitudinally movable friction disks connected with the low speed member, an intermediate series of longitudinally movable disks connected with the shaft, a pressure sleeve embracing the shaft, and having one slot inclined in one direction and another slot which, in its front end, is inclined in the opposite direction, and in its rear end is a straight longitudinal slot, studs fixed to the shaft and projecting radially therefrom into the first named slot, a longitudinally sliding sleeve compelled to rotate with said shaft, and a pin fixed thereto projecting into the other slot.

15. In planetary gearing, the combination of a driving shaft, a driven member, and intermediate mechanism which includes an independently rotatable low speed member, a plurality of longitudinally movable friction disks connected with said low speed member so as to be compelled to rotate therewith, a plurality of intermediate longitudinally movable friction disks connected with said driving shaft, a longitudinally movable pressure sleeve, which, when it is turned in the opposite direction to that in which the shaft rotates, is compelled to move longitudinally in the pressure direction, and vice versa, and mechanism for moving said sleeve relative to said shaft.

In testimony whereof, I hereunto affix my signature in the presence of two witnesses.

ALANSON P. BRUSH.

Witnesses:
E. L. THURSTON,
E. B. GILCHRIST.